May 19, 1959  W. J. WILLIAMS  2,887,588
AUTOMATIC REMOTE CONTROL ENGINE STARTING SYSTEM
Filed July 9, 1956  6 Sheets-Sheet 4
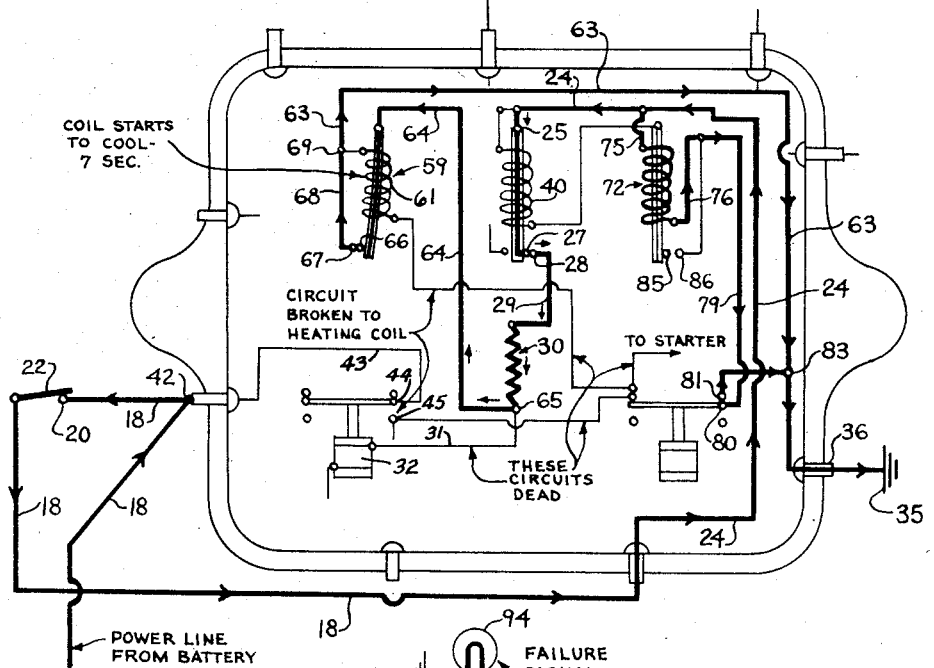
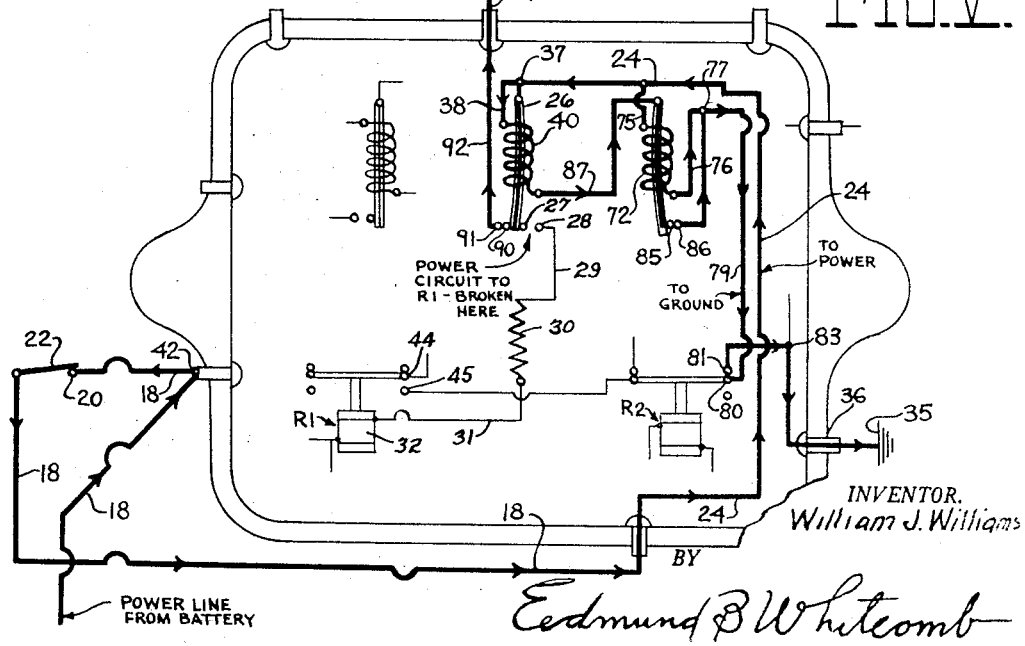
INVENTOR.
William J. Williams
BY
Edmund B Whitcomb
ATTORNEY

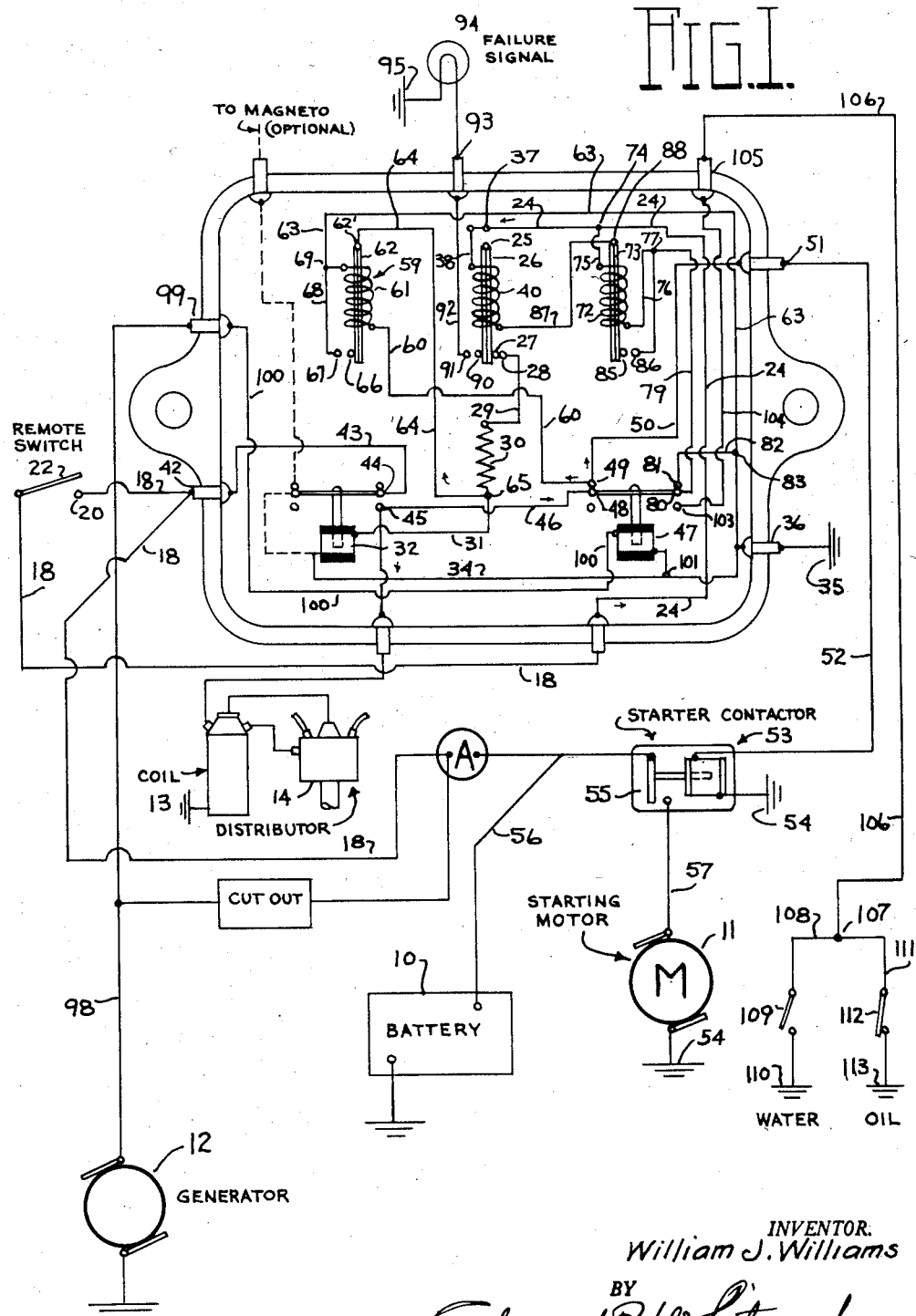

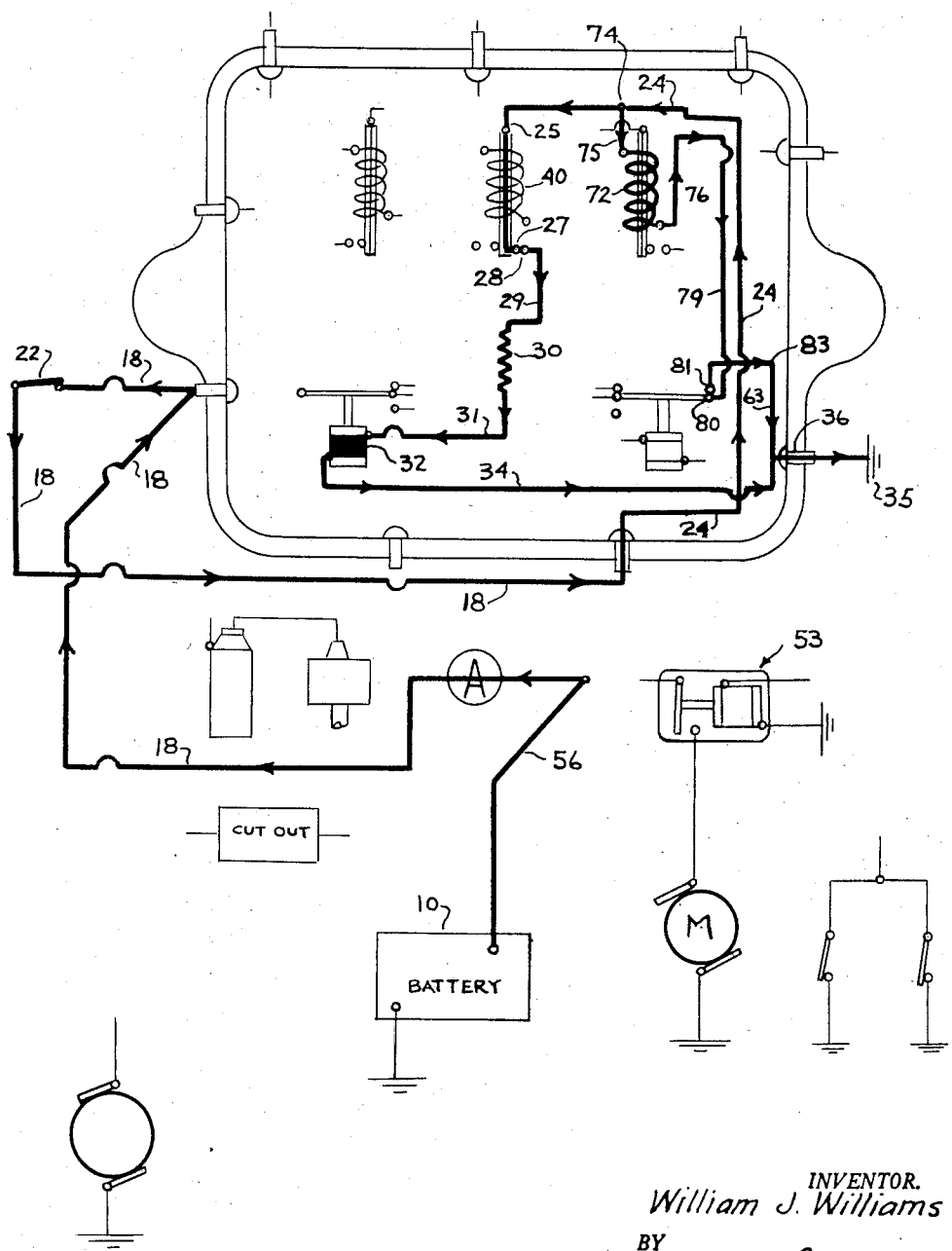

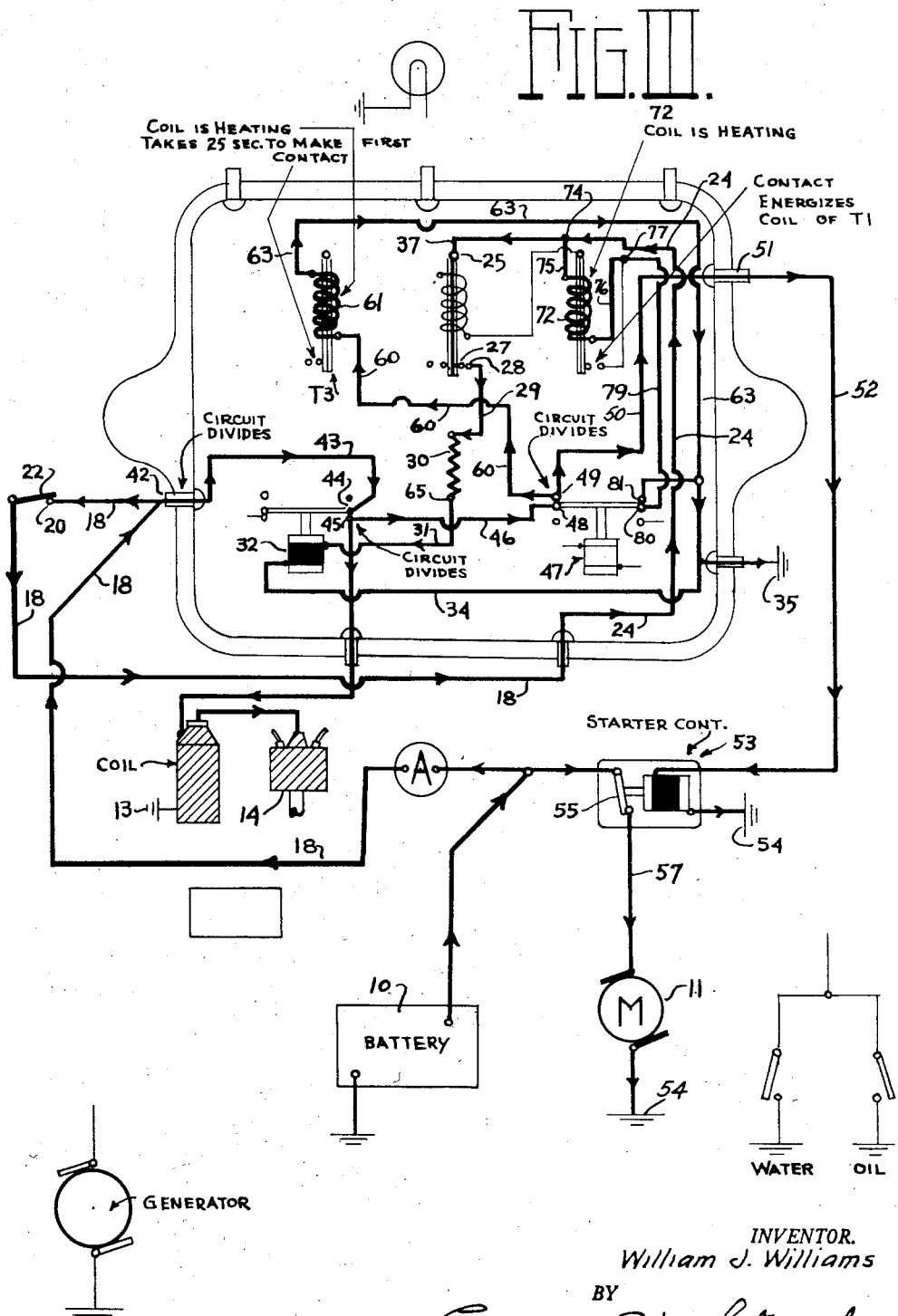

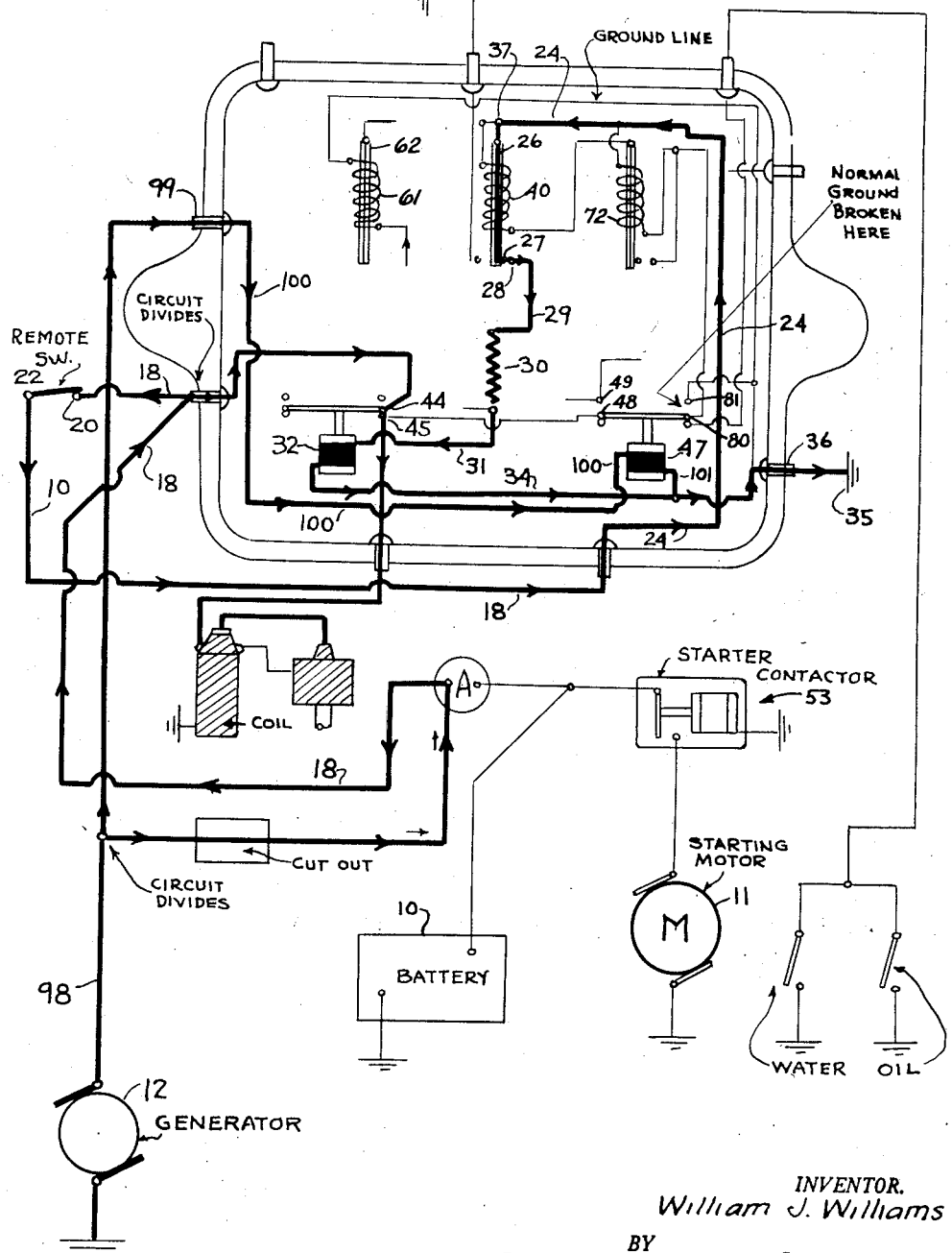

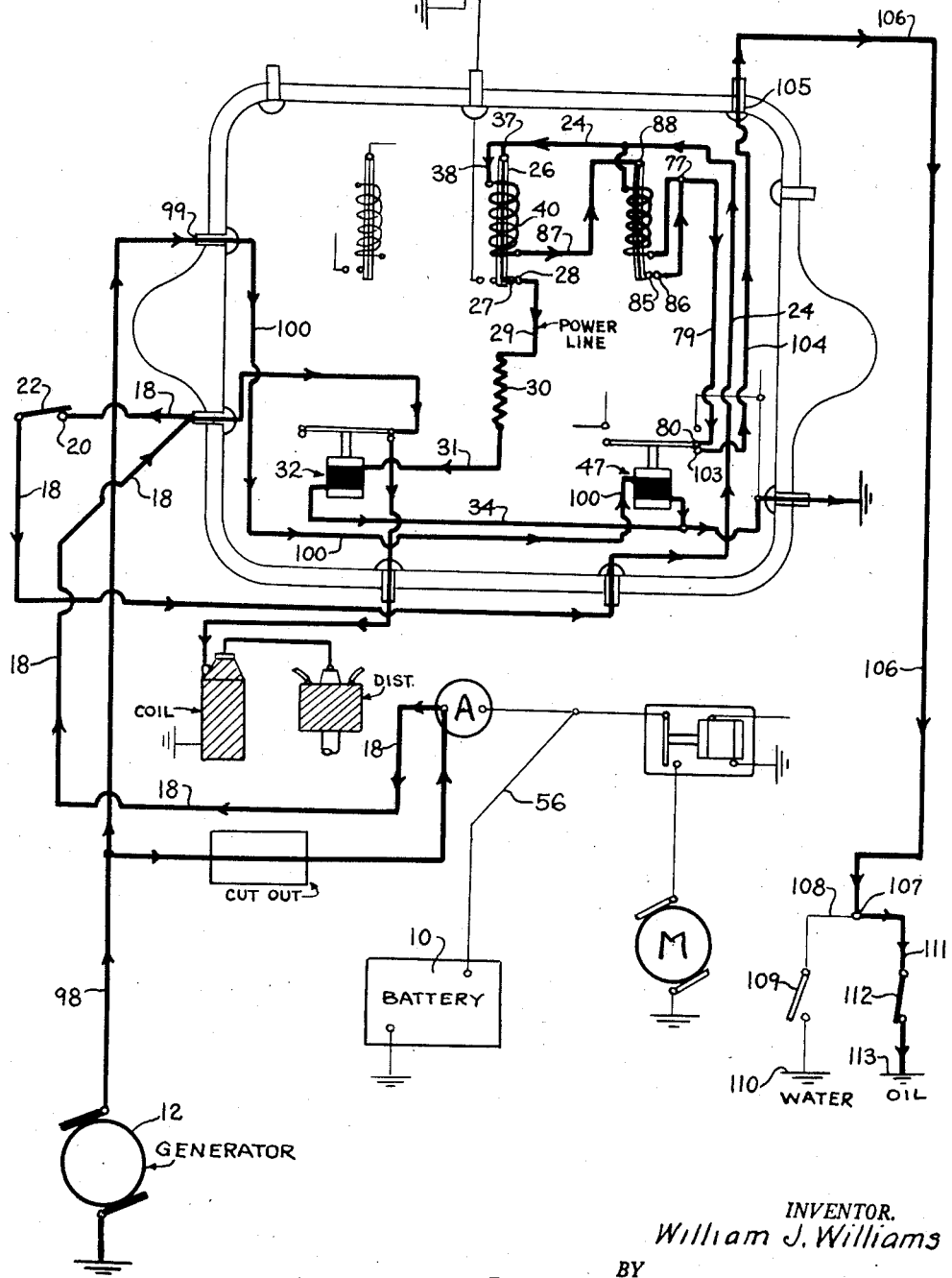

United States Patent Office 2,887,588
Patented May 19, 1959

2,887,588

AUTOMATIC REMOTE CONTROL ENGINE STARTING SYSTEM

William J. Williams, Wilmette, Ill.

Application July 9, 1956, Serial No. 596,466

12 Claims. (Cl. 290—37)

This invention relates to an improved engine starting system and the objects of the invention are to provide a system wherein a remotely operating switch is effective to start an internal combustion engine from a storage battery. The principal object is to provide an efficient, simplified and entirely automatic system in which, if the remotely controlled switch closes, the engine will first be cranked by a starting motor and, if not started promptly, the cranking will be repeated several times. Thereafter, if starting entirely fails the cranking circuits are opened and a "failure" signal energized. I also provide such a failure signal if the oil or water supply for the engine is insufficient.

Further objects and advantages are within the scope of this invention, such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a diagrammatic illustration of one embodiment of my invention.

Figure II illustrates the circuits involved immediately after closing the remote control switch—before any cranking.

Figure III illustrates the first cranking circuit immediately after the closing of the contacts on relay R1.

Figure IV illustrates the circuits involved when cranking is interrupted during the quick on and off operation.

Figure V illustrates the circuits when after about one and one-half minutes of such cranking the engine fails to start and the failure signal is energized.

Figure VI illustrates the circuits which are active when the engine is running and the generator operating.

Figure VII shows the condition of the circuits when a poor oil or water condition exists; after forty five seconds of this condition the engine will shut down and the failure signal be energized.

Reference is made to the drawing as a diagrammatic illustration of my improved automatic controlling unit for various types of internal combustion engines where I show a source of electrical current as the storage battery 10 of an electrical system for an engine including a starting motor 11, a generator 12 for recharging the battery and energizing circuits and an ignition system including a coil 13 and distributor 14, all interconnected by suitable wiring as shown and hereinafter described, and arranged whereby the engine may be automatically started or stopped as may be desired in accordance with any system with which my control unit may be employed.

Thus, lead 18 connects battery 10 with a starting controlling switch terminal 20 at the lower side of my control unit, said lead 18 including therein a remotely controlled switch 22. This switch 22 is adapted to be automatically operated by various mechanisms with which my unit is to be used, and may be a float switch, a pressure switch, a temperature switch or any type of electrical control which effects the operation of an engine.

Internally of my improved unit a lead 24 extends from input terminal 20 at the lower right hand side of the unit to one end 25 of the heat responsive switch element 26, through said element to contact 27 normally closed in cold position to contact 28, hence by lead 29 through a resistance 30 and by lead 31 to the relay 32 at the left hand side of the internal wiring diagram as shown. This relay 32 is connected by lead 34 to ground 35.

To heat the bi-metallic switch element 26, I provide a branch circuit from point 37 on lead 24 in a wire 38 to the coil 40 surrounding element 26. Coil 40 is grounded to ground 35 as will hereinafter appear.

Relay 32 being now energized, I provide thereby a control to energize the starting motor—from the battery 10. To accomplish this, it will be noted that battery lead 18 also connects with the other terminal 42 at the lower left hand side as shown of my unit and a lead 43 extends to movable contact 44 of the switch controlled by relay 32. This relay 32 energized, causes contact 44 to contact fixed points 45 which by lead 46 connects through another relay 47 and contacts 48 and 49, normally closed when relay 47 is deenergized, lead 50 to an exit terminal 51 at the upper right hand of the unit as shown, and hence by lead 52 current passes through starting contactor 53 to ground 54. As shown contactor 53 closes switch 55 in the leads 56 and 57 between the battery 10 and motor 11 to crank the engine.

After the engine has been cranked for about 25 seconds without starting, the cranking stops for a period of 7 to 8 seconds to be intermittently resumed until the engine starts. To accomplish this, I provide a heat responsive make and break device 59 including lead 60 from contact 49 to a heating coil 61 surrounding a bi-metallic switch element 62. The other side of this heating coil 61 is connected by a lead 63 to ground 35. The bi-metallic switch 62 has a connection at one end 62 to a lead 64, which joins lead 31 at a junction point 65.

At the other end switch 62 carries a contact 66 which is in normally open relation to a contact 67, the latter being connected by a lead 68 to a junction point 69, and thus by lead 63 to ground 35 as previously described.

At the time starter "motor" is cranking engine current has been also flowing from contact 49 through the lead 60, coil 61 surrounding bi-metallic switch 62, the result being that, when these bi-metallic elements have been sufficiently heated, the switch will deflect to the left, shown in Figures I and IV, closing contacts 66 and 67, and allowing the current which has been energizing coil 32, to short circuit through leads 68 and 63 to ground 35.

The deenergization of relay 32 breaks the circuit to the starting motor by separation of contacts 44 and 45, through circuits previously described, and cranking will stop.

However, the deenergization of relay 32 also breaks the circuit to the heating coil 61, due to the separation of contacts 44 and 45, and the coil 61 now cools, whereupon contacts 66 and 67 associated therewith are again separated, and current will once more flow (see Figure II) through lead 24 contact 25, bi-metallic switch 26, contacts 27 and 28 (closed) lead 29, resistance 30 and lead 31 to relay 32. Energization of this relay will again cause cranking of the engine as hereinabove described.

While this has been going on, current has been uninterruptedly passing through a coil 72 surrounding a bi-metallic switch element 73, this coil being energized by current from battery 10 passing through lead 24 (previously described) junction point 74, lead 75, coil 72, thence by lead 76, to junction point 77, lead 79, normally closed points 80 and 81 on relay 47, lead 82, junction point 83 and lead 63 to ground 35.

When the bi-metallic element 73 has been heated contact 85 carried by said element closes with contact 86 thus permitting current to flow from heating coil 40 to ground 35 by way of lead 87, one end 88 of bi-metallic switch element 73, points 85 and 86 (now closed) junction 77, and thence by way of lead 79 to ground 35 as hereinabove has been described.

When the coil 40 in bi-metallic switch 26 has been heated for the required time, the bi-metallic element deflects breaking contacts 27 and 28 and thus deenergizing relay 32, which receives current through these contacts as previously described.

This action in turn breaks contacts 44 and 45 and thus shuts off the supply of current through leads 46, points 48 and 49 and lead 50 exit terminal 51 to starter contactor 53, thus causing break in battery current to starter motor 11 and causing cranking to cease.

The deflection of bi-metallic switch 26 also causes contacts 90 carried by the bi-metallic element to close with contact 91 (see Figure V), thus allowing battery current to flow from lead 24, through the element and closed contacts 90 and 91, through a lead 92, to an exit terminal 93 and thus through a failure signal 94 to a ground 95.

It will thus be seen that, after the coil 72 is warmed up, the coil 40 on bi-metallic switch will be energized, breaking connections between the battery 10 and the starting motor 11 and simultaneously energizing the failure signal 94. Total cranking time is thus controlled by these coils and, if the engine does not start, the failure signal is energized.

If the motor does start normally a voltage will be produced by the generator 12 which will cut out the starting mechanism. Thus, I provide a lead 98 from the generator 12 to an exit terminal 99 and thence by a lead 100 to relay coil 47, the other side of the coil being connected by lead 101 to lead 34 and to ground 35. The energization of relay 47 will break contacts 48 and 49 and 80 and 81, thus deenergizing heating coil 61 on bi-metallic element 62 and also from lead 50 by the breaking of points 48 and 49, thus shutting off power to starter motor contactor 53.

The energization of relay 47 also breaks contacts 80 and 81 and connects point 80 to a contact 103 from whence by a lead 104, exit terminal 105 lead 106 junction 107, lead 108 water switch 109 to a ground 110, also from junction 107, a lead 111 goes to an exit switch 112, and thence to a ground 113.

It will be seen that closing of either oil or the water switch 109 and 112 will cause grounding of the circuit through bi-metallic switch 73, which will heat, thereafter heating the coil of bi-metallic switch 26 and through its contacts energizing the failure signal.

A time delay will occur between the closing of the oil pressure and water temperature switches before shutdown and failure signal but that allows starts on zero oil pressure to be made.

Where a magneto is used, the coil 32 acts through the switch as shown to break the ground circuit of such a magneto since such dotted lead line is connected to ground lead 34 through such switch.

Operation

The cycle of operation is shown step by step in Figures II through VII. Thus, in my improved control system when for some reason remote switch 22 closes, voltage from battery 10 is supplied as shown in Figure II to certain circuits wherein from said battery 10, leads 56 and 18 connect through remote control SW22 to terminal 20 of my control unit. Then lead 24 is energized to connect circuit to one end 25 of the heat responsive switch element 26, through said element to contact 27 normally closed in cold position to contact 28, hence by lead 29 through a resistance 30 and by lead 31 to the relay 32 at the left hand side of the internal wiring diagram as shown. This relay 32 is connected by lead 34 to ground 35. Hence relay 32 is now energized and a branch circuit to ground is also set up through coil 72, starting the "slow" heating effects.

The first cranking circuit is then effected as shown in Figure III, whence it will be seen that current from input terminal 42 passed by lead 43, lead 43 extends to movable contact 44 of the switch controlled by relay 32. This relay 32 energized causes contact 44 to contact fixed points 45, which by lead 46 connects through another relay 47 and contacts 48 and 49, normally closed when relay 47 is deenergized, lead 50 to an exit terminal 51 at the upper right hand of the unit as shown, and hence by lead 52 current passes through starting contactor 53 to ground 54. As shown, contactor 53 closes switch 55 in the leads 56 and 57 between the battery 10 and motor 11 to crank the engine. If the engine starts satisfactorily, I have provided normally running condition hereinafter described.

Figure III also shows how, in case the engine does not start within approximately 25 seconds, the relatively quickly heating coil 61 is warming up and, referring now to Figure IV, here I show the action of my control system in interrupting and reestablishing the cranking for several separate attempts to start, where it will be seen that warming of coil 61, shifts contact 66 to make contact with point 67 and thereby provide a direct circuit to ground from point 65, thus short circuiting relay 32 and interrupting the cranking circuit.

However, the deenergization of relay 32 also breaks the circuit to the heating coil 61, due to the separation of contact 44 and 45, and the coil 61 now cools, whereupon in about 7 or 8 seconds contacts 66 and 67 associated therewith are again separated, and current will once more flow through lead 24 contact 25, bi-metallic switch 26, contacts 27 and 28 (closed) lead 29, resistance 30 and lead 31 to relay 32. Energization of this relay will again cause cranking of the engine as hereinabove described. Unless the engine starts, this intermittent cranking goes on for several separate attempts of about seven seconds each, until completely discontinued by the circuits shown in Figure V. Here, the heating coil 72, which has a relatively long heating period, has been continuously energized during this intermittent cranking, and after a predetermined period this coil 72 causes points 85 and 86 to close, thereby providing a circuit through coil 40 which now begins to heat. After another period of time, the bi-metallic element 26 of coil 40 will shift and open points 27 and 28 which are in the circuit from the battery through relay 32 for cranking purposes (see Figures II and III). The elapsed time required for both these heating coils or elements 72 and 40 to heat sufficiently to effect an opening of the cranking circuit is approximately 1½ minutes in my present embodiment of my invention. Opening points 27 and 28 deenergizes relay 32, breaking the cranking circuit at points 44 and 45. As also shown in Figure V, after opening of points 27 and 28 bi-metallic element 26 closes points 90 and 91 to energize a failure signal 94, whereupon the engine must be inspected and the cause of failure corrected.

Upon a normal starting of the engine by the starting motor 11, the engine drives generator 12 and the circuits now in operation are shown in Figure VI. Here it will be seen that current passes by a lead 98 from the generator 12 to an exit terminal 99 and thence by a lead 100 to relay coil 47, the other side of the coil being connected by lead 101 to lead 34 and to ground 35. The energization of relay 47 will break contacts 48 and 49, thus deenergizing heating coil 61 on bi-metallic element 62.

Energizing relay 47 also breaks points 80 and 81, thus deenergizing heating coil 72, which also controls heating coil 40. Thus, all heating coils are now deenergized.

Moreover, energizing relay 47, by breaking points 48 and 49, also disconnects the motor starting circuit to contactor 53 and hence no more cranking by the starting motor can occur while the generator 12 is functioning, as shown in Figure VI.

My invention comprehends each and every modification and embodiment thereof coming within the scope of the claims hereof.

What I claim is:

1. In a starting control system adapted to be connected for remote initiation by a change of condition, including electrical circuits between a source of energy and a cranking motor, said circuits including an automatic intermittent and final circuit making and breaking network for effecting actuation of said motor cranking, said network including a first relay and current supplying circuits for energizing said cranking circuit to the motor controlled by said first relay, a remote controlled switching means in said network for effecting supply of current for said network and cranking circuits; a heat responsive switching unit in said network; means whereby said heat responsive unit effects deenergization and energization of said relay and cranking circuits upon relatively short periods of heating, another heat responsive means having a relatively long heating period, said last mentioned heating means being continuously heated while said intermittent cranking is in operation; means whereby said second heater is effective to deenergize said relay of said network and open circuit said starting cranking circuit; a normally deenergized generator controlled second relay in said network; circuits in said network controlled by said second relay effective to maintain closed said cranking circuit during said intermittent and final motor cranking control operations; and means to energize said second relay to maintain said cranking circuit in open circuit position after starting has been effected.

2. In a starting control system adapted to be connected for remote initiation by a change of condition, including electrical circuits between a source of energy and a cranking motor, said circuits including an automatic intermittent and final circuit making and breaking network for effecting actuation of said motor cranking, said network including two relays and current supplying circuit for energizing said cranking circuit and for maintaining said cranking circuit deenergized after starting is effected; a remote controlled switching means in said network for effecting supply of current for said cranking circuit when one of said relays is energized and the other deenergized; a heat responsive switching unit in said network, said heat responsive unit connected to supply current to said cranking circuits upon relatively short periods of heating of said unit and to effect deenergization and reenergization of one of said relays while the other relay is deenergized, another heat responsive means having a relatively long heating period, said last mentioned heat responsive means having a coil connected to be continuously heated while said intermittent cranking is in operation and said second heat responsive means connected to effect deenergization of said first relay of said network and open circuit said starting cranking circuit while said second relay is deenergized; said network having a third heating means energized by said second heating means and establishing connections, to prevent reenergization of said first mentioned relay after the first operation of said second heat responsive means; and means to energize said second relay when starting is effected to maintain said cranking circuit in open circuit position.

3. In an engine starting control system adapted to be connected for remote initiation by a change of condition, including electrical circuits between a source of energy and a cranking motor, said circuits including an automatic intermittent and final circuit making and breaking network for effecting actuation of said motor cranking of the engine, said network including two relays and current supplying circuits for energizing said cranking circuit and for maintaining said cranking circuit deenergized after starting is effected, said cranking circuit including a lead from said source of energy to closed points of one of said relays, thence by a lead to points of the other of said relays, thence by a lead to a coil of a starter contactor to energize the same; a switch in said starter contactor arranged to be closed by said coil, a lead from said source of electrical energy to said switch, a lead from said switch to said cranking motor arranged to actuate the same; a remote controlled switching means in said network for effecting supply of current for said cranking circuit when one of said relays is energized and the other deenergized; a heat responsive switching unit in said network, said heat responsive unit connected to effect deenergization and energization of said one of said relays while the other relay is deenergized, to supply current to said cranking circuits during relatively short periods of heating of said unit, another heat responsive means having a relatively long heating period, said last mentioned heating means being continuously heated while said intermittent cranking is in operation and said second heat responsive means including a third heat responsive means connected to effect deenergization of said first relay of said network and open circuit said starting cranking circuit while said second relay is deenergized; and means to energize said second relay when the engine is running to maintain said cranking circuit in open circuit position.

4. In an engine starting control system adapted to be connected for remote initiation by a change of condition, including electrical circuits between a source of energy and a cranking motor, said circuits including an automatic intermittent and final circuit making and breaking network for effecting actuation of said motor cranking of the engine, said network including a first relay and current supplying circuits for energizing said cranking circuit to the motor controlled by said first relay, a remote controlled switching means in said network for effecting supply of current for said cranking circuit; a first bimetallic heat responsive switching unit in said network, said heat responsive unit connected to effect deenergization and energization of said relay and cranking circuits upon relatively short periods of heating, said intermittent circuit making and breaking network including means arranged to energize said first relay, said means including a lead from said source of electrical energy to said remote control switching means, thence by a lead to a contact point; a lead from said contact point to a point on a bi-metallic element of a first heat responsive device, thence through points carried on said bi-metallic element by connections to a junction point in said connections, a lead from said junction point to a coil of said first relay to energize same, a lead from said coil to a ground, a second heat responsive means having a relatively long heating period, said last mentioned heating means being connected to said first mentioned lead to be continuously heated while said intermittent cranking is in operation and said second heat responsive means closing contacts connected to energize said first heat responsive device to open its said points to effect deenergization of said relay of said network and open circuit said starting cranking circuit; a normally deenergized generator controlled second relay in said network; circuits in said network controlled by said second relay effective to maintain closed said cranking circuit during said intermittent and final motor cranking control operations; and means to energize said second relay when the engine is running to maintain said cranking circuit in open circuit position.

5. In a starting control system adapted to be connected for remote initiation by a change of condition, including electrical circuits between a source of energy and a cranking motor, said circuits including an automatic intermittent and final circuit making and breaking network for effecting actuation of said motor cranking, said network including a first relay and current supplying circuits for energizing said cranking circuit to the motor controlled by said first relay, a remote controlled switching means in said network for effecting supply of current for said network and cranking circuits; a heat responsive switching unit in said network; means whereby said heat responsive unit effects deenergization and energization of said relay and cranking circuits upon relatively short periods of heating, another heat responsive means having a relatively long heating period, said last mentioned heating means being continuously heated while said intermittent cranking is in operation; means whereby said second heating means is effective to deenergize said relay of said network and open circuit said starting cranking circuit; a failure signal circuit, means whereby the actuation of said second heating means to deenergize said first relay concomitantly energizes said failure signal; a normally deenergized generator controlled second relay in said network; circuits in said network controlled by said second relay effective to maintain closed said cranking circuit during said intermittent and final motor cranking control operations; and means to energize said second relay to maintain said cranking circuit in open circuit position after starting has been effected.

6. In a starting control system adapted to be connected for remote initiation by a change of condition, including electrical circuits between a source of energy and a cranking motor, said circuits including an automatic intermittent and final circuit making and breaking network for effecting actuation of said motor cranking, said network including a first relay and current supplying circuits for energizing said cranking circuit to the motor controlled by said first relay, a remote controlled switching means in said network for effecting supply of current for said network and cranking circuits; a heat responsive switching unit in said network; means whereby said heat responsive unit effects deenergization and energization of said relay and cranking circuits upon relatively short periods of heating, another heat responsive means having a relatively long heating period, said last mentioned heating means being continuously heated while said intermittent cranking is in operation; means whereby said second heater is effective to deenergize said relay of said network and open circuit said starting cranking circuit; a normally deenergized generator controlled second relay in said network; circuits in said network controlled by said second relay effective to maintain closed said cranking circuit during said intermittent and final motor cranking control operations; and means to energize said second relay to maintain said cranking circuit in open circuit position after starting has been effected to energize said second relay; water and oil controlling danger signal circuits connected to points on said second relay; automatic means associated with said circuits for establishing ground connections in case of failure of water and oil and means to indicate said failure through said failure circuit.

7. In an engine starting controlling system adapted to be connected for remote initiation by a change of condition, including electrical circuits between a source of energy and a cranking motor, said circuits including an automatic intermittent and final circuit making and breaking network for effecting actuation of said cranking motor by said circuits, said network including a relay; said relay connected to effect operation of said cranking motor when said relay is energized; a remote controlled switching means between said source of energy and said network; a heat responsive switching means in said network; said heat responsive means including normally open switch points; an energizing circuit for said relay having a grounding short circuit to de-energize said relay, said short circuit including said normally open switch points; said heat responsive means being connected in said motor cranking effecting network to heat said means when said motor is cranked and close said switch points after a relatively short period of heating whereby said short circuit is connected to ground to effect de-energization of said relay to effect disconnection of said cranking motor and disconnection of a circuit for heating said heat responsive means, said network including circuits connected to automatically effect re-cranking of said motor upon opening of said switch points of said heat responsive switching means, additional heat responsive means in said network for breaking said cranking circuit after a relatively long period of intermittent cranking, said additional heat responsive means including a circuit in said network connected to continuously energize said additional heat responsive means while said motor is being intermittently cranked under control of said short period first mentioned heating means, said additional heat responsive means having switch points operated thereby, said last mentioned switch points connected and located in the network for energizing said relay, whereby upon a long period of heating said switch points are moved by said heating means to break said relay circuit and de-energize said cranking motor.

8. In an engine starting and operating controlling system adapted to be connected for remote initiation by a change of condition, including electrical circuits between a source of energy and a cranking motor, said circuits including an automatic intermittent and final circuit making and breaking and generating and ignition supplying network for effecting actuation of said cranking motor and operation of the engine, said network including two relays and current supplying circuits for energizing said cranking circuit and for maintaining said cranking circuit deenergized after starting is effected, said cranking circuit including a lead from said source of energy to closed points of one of said relays, thence by a lead to points of the other of said relays, thence by a lead directly to a coil of a starter contactor to energize the same; a switch in said starter contactor arranged to be closed by said coil, a lead from said source of electrical energy to said switch, a lead from said switch to said cranking motor connected to actuate the same; a remote controlled switching means in said network for effecting supply of current for said cranking circuit and network, said network connected so that one of said relays is energized and the other deenergized; a heat responsive switching unit in said network, said heat responsive switching unit being connected to effect deenergization and energization of one of said relays while the other relay is deenergized, to supply current to said cranking circuits upon relatively short periods of heating of said heat responsive switching unit, another heat responsive means having a relatively long heating period, said last mentioned heating means being continuously heated while said intermittent cranking is in operation and said second heater being connected to effect deenergization of said first relay of said network and open circuit said starting cranking circuit while said second relay is deenergized; a generator driven by said engine; a circuit from said generator to said network to energize both said relays whereby energization of said first relay supplies current for the ignition of said engine and energization of said second relay maintains said motor cranking circuit in open circuit position, said network being so connected that the opening of said remote controlled switching means initiates a resetting of said network to initial position by disconnecting said second heat responsive means from the source of energy.

9. In an engine multiple cranking failure indicating and resetting electrical controlling network, a single remotely operated switch means connected to effect operation of said cranking operations and to subsequently reset said network automatically for later operation after engine failure of starting, said network including electrical connections between a source of energy and an engine cranking motor, said connections including automatic intermittent and final making and breaking circuits for effecting actuation of said cranking motor; relay and current supplying means in said network for energizing a cranking circuit to the motor controlled by a single relay and the closure of said single switch means; a plurality of heat responsive switching units in said network; means whereby said heat responsive switching units effect energization and deenergization of said relay and cranking circuits for intermittent cranking upon relatively short periods of heating, and deenergization upon a relatively long heating period, certain of said heat responsive switching units being continuously heated while said intermittent cranking is in operation; means whereby said certain heat responsive switching units are effective to finally open circuit said starting cranking circuit; means to indicate failure to effect engine operation; said relays and current supplying circuits for said cranking operations being so connected that opening of said remote single switch means operates to automatically reset said network into initial position.

10. In an engine starting controlling system adapted to be connected for remote initiation by a change of condition, including electrical circuits between a source of energy and a cranking motor, said circuits including an automatic intermittent and final circuit making and breaking network for effecting actuation of said cranking motor by said circuits, said network including a relay; said relay connected to effect operation of said cranking motor when said relay is energized; a remote controlled switching means between said source of energy and said network; a heat responsive switching means in said network; said heat responsive means including normally open switch points; an energizing circuit for said relay having a grounding short circuit to de-energize said relay, said short circuit including said normally open switch points; said heat responsive means being connected in said motor cranking effecting network to heat said means when said motor is cranked and close said switch points after a relatively short period of heating whereby said short circuit is connected to ground to effect de-energization of said relay to effect disconnection of said cranking motor and disconnection of a circuit for heating said heat responsive means, said network including circuits connected to automatically effect re-cranking of said motor upon opening of said switch points of said heat responsive switching means, additional heat responsive means in said network for breaking said cranking circuit after a relatively long period of intermittent cranking, said additional heat responsive means including a circuit in said network connected to continuously energize said additional heat responsive means while said motor is being intermittently cranked under control of said short period first mentioned heating means, said additional heat responsive means arranged to deenergize said relay upon a long period of heating whereby said motor cranking circuit is deenergized, said network arranged whereby upon resetting of said remote controlled switching means said network automatically is reset to initial position.

11. In an engine starting controlling system adapted to be connected for remote initiation by a change of condition, including electrical circuits between a source of energy and a cranking motor, said circuits including an automatic intermittent and final circuit making and breaking network for effecting actuation of said cranking motor by said circuits, said network including a relay; said relay connected to effect operation of said cranking motor when said relay is energized; a remote controlled switching means between said source of energy and said network; a heat responsive switching means in said network; said heat responsive means including normally open switch points; an energizing circuit for said relay having a grounding short circuit to de-energize said relay, said short circuit including said normally open switch points; said heat responsive means being connected in said motor cranking effecting network to heat said means when said motor is cranked and close said switch points after a relatively short period of heating whereby said short circuit is connected to ground to effect de-energization of said relay to effect disconnection of said cranking motor and disconnection of a circuit for heating said heat responsive means, said network including circuits connected to automatically effect re-cranking of said motor upon opening of said switch points of said heat responsive switching means, additional heat responsive means in said network for breaking said cranking circuit after a relatively long period of intermittent cranking, said additional heat responsive means including two heat responsive units, one a slow heat actuated unit and the other relatively fast, arranged whereby said relatively slow acting heat actuated unit is connected in said network for continuous energization, while said motor is being intermittently cranked, said slow heat actuated unit having switch points operated thereby to energize the relatively fast unit of said two last mentioned heat responsive units, whereby upon a long period of heating said switch points of said relatively fast acting heat responsive unit are moved by said heating means to break said relay circuit and deenergize said cranking motor.

12. In an engine starting controlling system adapted to be connected for remote initiation by a change of condition, including electrical circuits between a source of energy and a cranking motor, said circuits including an automatic intermittent and final circuit making and breaking network for effecting actuation of said cranking motor by said circuits, said network including a relay; said relay connected to effect operation of said cranking motor when said relay is energized; a remote controlled switching means between said source of energy and said network; a heat responsive switching means in said network; said heat responsive means including normally open switch points; an energizing circuit for said relay having means therein arranged for de-energizing said relay, said deenergizing means including said normally open switch points; said heat responsive means being connected in said motor cranking effecting network to heat said means when said motor is cranked and close said switch points after a relatively short period of heating whereby said de-energizing means effects de-energization to effect disconnection of said cranking motor and disconnection of a circuit for heating said heat responsive means, said network including circuits connected to automatically effect re-cranking of said motor upon opening of said switch points of said heat responsive switching means, additional heat responsive means in said network for breaking said cranking circuit after a relatively long period of intermittent cranking, said additional heat responsive means including two heat responsive units, one a slow heat actuated unit and the other relatively fast, arranged whereby said relatively slow acting heat actuated unit is connected in said network for continuous energization, while said motor is being intermittently cranked, said slow heat actuated unit having switch points operated thereby to energize the relatively fast unit of said two last mentioned heat responsive units, whereby upon a long period of heating said switch points of said relatively fast acting heat responsive unit are moved by said heating means to break said relay circuit and de-energize said cranking motor.

References Cited in the file of this patent

UNITED STATES PATENTS

| | | |
|---|---|---|
| 2,144,786 | Baer et al. | Jan. 24, 1939 |
| 2,197,726 | Johnson | Apr. 16, 1940 |